3,689,448
PROCESS FOR THE MANUFACTURE OF ETHYLENE COPOLYMER DISPERSIONS
Harald Berger, Kelkheim, Herbert Bestian, Frankfurt, and Helmut Korbanka, Adelsried, Germany, assignors to Farbwerke Hoechst Aktiengesellschaft vormals Meister Lucius & Bruning, Frankfurt am Main, Germany
No Drawing. Continuation-in-part of application Ser. No. 732,554, May 28, 1968. This application Oct. 9, 1970, Ser. No. 79,664
Int. Cl. C08f 1/09
U.S. Cl. 260—29.6 TA          6 Claims

ABSTRACT OF THE DISCLOSURE

Process for the manufacture of ethylene copolymer dispersions by copolymerizing ethylene with alkali metal salts of one or more mono-unsaturated acylamide-N-sulfonic acids of the formula $R_1CH=C(R_2)CONH—SO_3H$, wherein $R_1$ and $R_2$ each represents a hydrogen atom or an organic radical containing 1 to 10 carbon atoms. If necessary, further copolymerizable compounds may be used additionally. The copolymer dispersions of the invention may be used for coating plastics materials, wood, paper and the like as well as for impregnating or finishing paper, felt or fibrous materials.

---

This application is a continuation-in-part of our now abandoned application Ser. No. 732,554 filed May 28, 1968.

The present invention relates to a process for the manufacture of ethylene copolymer dispersions.

It is known to obtain polyethylene dispersions by polymerizing ethylene in the aqueous phase in the presence of emulsifiers and free radical initiators at elevated pressure and temperature. Dispersions of this type are used, for example, as bright drying polish emulsions for floor polish. They have the drawback that on drying on a substrate they yield a film which is affected by water or which is totally reemulsified. It is also known to copolymerize ethylene in an aqueous medium without emulsifying agents with the salts of polymerizable acids, for example acrylic acid, methacrylic acid and vinyl sulfonic acid, to yield the corresponding dispersions. After drying on a substrate, the polyethylene copolymer dispersions obtained in this manner yield a thin film whose sensitivity to water is reduced by a subsequent treatment with acids. However, the film is affected by solution having a basic reaction, for example by soap solutions. The known polyethylene dispersions have the further drawback that the dried films are soluble in the organic solvents usually employed in industry which very much limits the applicability of said dispersions.

Now we have found a process for the manufacture of dispersions of copolymers of ethylene with a solid content of 10 to 60, preferably 25 to 50% by weight by copolymerizing ethylene with ethylenically unsaturated compounds at pressures within the range of from 50 to 2500 atmospheres gage, preferably 100 to 1000 atmospheres gage, and at temperatures within the range of from 50° to 250° C., preferably 120° to 180° C., in the presence of 0.1 to 15, preferably 0.5 to 5% by weight (calculated on the solid content of the dispersion) free radical initiators which comprises polymerizing ethylene with the sodium or potassium salt of one or more mono-unsaturated acylamide-N-sulfonic acids corresponding to the formula $$R_1CH=C(R_2)COHN—SO_3H \quad (I)$$

wherein $R_1$ and $R_2$ each represent a hydrogen atom or an organic radical containing 1 to 10 carbon atoms, in an amount within the range of from 0.1 to 30 percent by weight, calculated on the solid content of the dispersions and, if necessary, with further copolymerizable compounds in an amount below 50 percent by weight, calculated on the copolymer.

For the process of invention for the manufacture of such dispersions it is not necessary to use emulsifiers.

By "organic radical" there is to be understood preferably a hydrocarbon radical; for $R_1$ especially preferred are alkyl and phenyl radicals and among them particularly methyl or phenyl radicals; for $R_2$ especially preferred are alkyl radicals and among them particularly the methyl radical.

In the process of the invention, copolymerizable compounds are, for example, the alkali metal salts of β-cyclohexyl-acrylic acid-amide-N-sulfonic acid, α-ethyl-acrylic acid-amide-N-sulfonic acid, β-ethyl-acrylic acid-amide-N-sulfonic acid, α-hexyl-acrylic acid-amide-N-sulfonic acid, α-iso-butyl-acrylic acid-amide-N-sulfonic acid; there may be used with special advantage, for example, the alkali metal salts of acrylic acid-amide-N-sulfonic acid, β - phenyl - dimethylacrylic-acid-amide-N-sulfonic acid, acrylic acid-amide-N-sulfonic acid, crotonic-acid-amide-N-sulfonic acid, above all of methacrylic acid-amide-N-sulfonic acid.

However, there may also be copolymerized mixtures of the alkali metal salts of several mono-unsaturated acyl-amide-N-sulfonic acids corresponding to the aforesaid Formula I with ethylene.

For the copolymerization of ethylene there are used the alkali metal salts of the mono-unsaturated acylamide-N-sulfonic acids, in which case the potassium salts yield dispersions having especially advantageous properties. The formation of salt takes place by neutralizing the sulfonic acid group. Moreover, on account of the considerable acidity of the hydrogen atom of the amide group, it may also be replaced by an alkali metal atom. The resulting di-alkali metal salts are preferably used in the copolymerization according to the present invention.

The preparation of the acyl-amide-N-sulfonic acids and their salts is carried out by saponification of the corresponding acyl-amide-N-sulfochlorides with alcoholic solutions of alkali metal hydroxides. These sulfochlorides are obtained according to the German Patent No. 931,225 (published Feb. 10, 1955) by converting chlorosulfonyl isocyanate ($Cl—SO_2—N=C=O$) with unsaturated organic carboxylic acids. Chlorosulfonyl isocyanate is prepared according to the German Patent No. 928,896 by condensation of sulfurtrioxide with cyanogen chloride.

The copolymerization according to the invention is carried out at elevated pressures and temperatures. Pressures within the range of from 50 to 2500 atmospheres gage are preferably applied. Dispersions which meet most of the utilitarian requirements are obtained when applying pressures within the range of from 100 to 1000 atmospheres gage. It is also possible to start the polymerization at relatively low pressures within the range of from 50 to 200 atmospheres gage and to continue the polymerization at a higher pressure. The copolymerization is carried out at temperatures within the range of from 50° to 250° C., preferably 120° to 180° C.

As free radical initiators there may be used all known inorganic and organic compounds which form free radicals under the reaction conditions, for example peroxy compounds and azo compounds. The copolymerization can also be carried out by means of mixtures of different free radical initiators or with redox systems. However, for carrying out the process of the present invention there are preferably used hydrogen peroxide and peroxy disulfates, soluble in aqueous phase, for example sodium-, potassium- or ammonium peroxy-disulfate in a concentration of 0.1 to 15 preferably 0.5 to 5% by weight (calculated on the solid content of the dispersion).

The copolymerization is carried out in the absence of the known and usually employed emulsifying agents. It may be carried out in batches or in a continuous manner. In the batch-process, either the total amount of the reaction components is placed in the reaction vessel, or the reaction components are metered into the reaction space in different partial currents during the polymerization. In the continuous operation, a spiral tube, a pressure vessel or series-connected pressure reservoirs may be used as reaction vessels.

In the copolymerization with ethylene, the alkali metal salts of the unsaturated acylamide-N-sulfonic acids are advantageously used in the form of aqueous solutions. The solutions should contain of from 0.1 to 30 percent by weight, preferably 0.2 to 10 percent by weight, of the said alkali metal salts when the copolymerization is allowed to proceed until the dispersion has a solid content of at least 40 percent by weight. When the conversion is allowed to proceed until the dispersion has a solid content of less than 40 percent by weight, there may be used correspondingly lower alkali metal salt concentrations; for example, when the conversion is allowed to proceed until a solid content of 20 percent by weight is attained, it is sufficient to use half of the indicated amount.

The copolymerization of ethylene with the salts of unsaturated acylamide-N-sulfonic acids may also be carried out in the presence of further copolymerizable compounds. Exemplary of the compounds that may be used are acrylamide, acrylonitrile, alkali metal salts of unsaturated aliphatic and aromatic carboxylic or sulfonic acids containing 1 to 20 carbon atoms, vinyl esters, vinyl halides, open-chain and cyclic N-vinyl amides, styrene or butadiene; further may be used esters of acrylic and methacrylic acid with aliphatic alcohols with 1 to 18 carbon atoms, preferably methyl-, ethyl-, butyl-, hexyl-, 2-ethyl- and stearylacrylate and methyl-, ethyl- and butylmethacrylate. In the resulting dispersions the copolymers contain the said compounds in an amount below 50 percent by weight, preferably 15 to 45 percent by weight, especially advantageously 35 to 45 percent by weight. The copolymer dispersions obtained by the process of the present invention are very stable and heat- and freeze-thaw resistant. With high solid contents they have latex viscosities of from 1.5 to 20.0 centistokes (25° C.) and are free of creaming constituents. The dispersions have an alkaline reaction and pH value of from 8 to 12. They have an unexpectedly high surface tension within the range of from 45 to 70 dynes/cm. and, thereby, differ from polyethylene dispersions of the same stability obtained by known processes with the aid of emulsifiers. When the dilute or undiluted copolymer dispersions of the invention, if necessary or desired after the addition of one of the usually employed levelling agents, are allowed to dry on a substrate, they yield a highly glossy film which is little sensitive to water and has a minor dirt-absorbing and dust-binding capacity.

When an acid is added to the copolymer dispersion of the invention, free amide-N-sulfonic acid groupings are formed in the copolymer from the alkali metal salts. With contents of less than 0.2 percent by weight, calculated on the solid content of the acylamide-N-sulfonic acids incorporated by polymerization, the solid content precipitates from the copolymer dispersion, whereas with contents greater than 0.2 percent by weight, calculated on the solid content, the dispersion remains freeze-thaw resistant.

Not only the solids precipitated from the copolymer dispersions but also the films obtained by allowing the dispersions to dry are practically insoluble in the usual organic solvents.

The solid can be precipitated from the copolymer dispersions by the addition of organic solvents miscible with water, for example methanol, ethanol, acetone, and by means of aqueous solutions of inorganic salts, whereon the copolymers of ethylene-acylamide-N-sulfonate are obtained in the form of a fine-grained white powder.

The copolymers precipitated from the dispersions contain of from 0.05 to 30 percent by weight of alkali metal salts of the acylamide-N-sulfonic acids. Dispersions whose solids consist of from 0.1 to 12 percent by weight of the alkali metal salt of the acylamide-N-sulfonic acids and 99.9 to 88 percent by weight of ethylene possess especially favorable properties. The particle size of the polyethylene dispersions of the invention is within the range of from 10 to 500 millimicrons, the particle size distribution being very narrow.

With compounds of the type

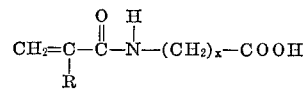

which only allow mono-alkali metal salt to be formed, Glabisch obtains according to U.S. Patent 3,265,654 under a pressure of 200 atmospheres gauge dispersions having a solid content of at most 20.6 and 24.6% by weight, respectively (Examples 10 and 13).

With compounds of the type

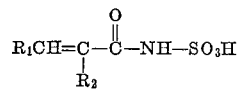

as used in our process of invention which allow di-alkali metal salts to be formed and, therefore, have considerably improved hydrophilic properties, much higher solid content can be obtained as demonstrated by the following comparison examples:

COMPARISON EXAMPLE 1

15 grams of dipotassium-methacrylamidosulfonate according to the formula

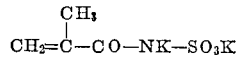

in 1500 milliliters of $H_2O$ were introduced into an autoclave with stirrer. After heating at a temperature of 135–140° C. ethylene was forced in until the pressure reached 200 atmospheres. During the course of 4 hours, 60 grams of dipotassium-methacrylamidosulfonate and 30 grams of $K_2S_2O_8$ in 2000 milliliters of $H_2O$ were metered in. The pressure in the autoclave which dropped during polymerization was maintained by further introducing ethylene. When the reaction was terminaed a stable dispersion was obtained containing 34.5% of solid matter. The dispersion had a pH of 10.2, a latex viscosity of 4.6 centistokes at 25° C., and a surface tension of 56.2 dynes/cm.

When the dispersion was allowed to dry on a smooth support, a non-sticky film was obtained which was substantially stable to water and the usual organic solvents. The solid matter contained 4.8% by weight of copolymerized dipotassium-methacrylamidosulfonate.

COMPARISON EXAMPLE 2

A dispersion was prepared with dipotassium-acrylamidosulfonate according to the formula

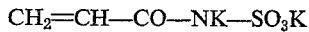

as comonomer in the manner specified in Example 1.

The autoclave was first charged with 22.5 grams of dipotassium-acrylamido-sulfonate in 1500 milliliters of $H_2O$. Under an ethylene pressure of 200 atmospheres gauge, 90 grams of dipotassium-acrylamidosulfonate and 35 grams of $K_2S_2O_8$ in 2000 milliliters of water were metered in at a reaction temperature of 130° C. After about 150 minutes a dispersion was obtained having a solid content of 41.5% by weight. The dispersion had a pH of 10.4, a latex viscosity of 8.37 centistokes at 25° C. and a surface tension of 42.0 dynes/cm. The solid matter contained 5.2% by weight of copolymerized dipotassium-acrylamidosulfonate.

COMPARISON EXAMPLE 3

A dispersion was prepared with dipotassium-crotyl-amidosulfonate according to the formula

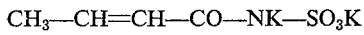

$$CH_3-CH=CH-CO-NK-SO_3K$$

as comonomer in the manner specified in Example 1.

The autoclave was first charged with 15 grams of dipotassium-crotylamidosulfonate in 1500 milliliters of water. Against an ethylene pressure of 200 atmospheres gauge and at a reaction temperature of 130° C., 60 grams of dipotassium-crotylamidosulfonate and 35 grams of $K_2S_2O_8$ in 2000 milliliters of water were metered in. After about 5 hours a dispersion was obtained having a solids content of 37.3% by weight. The dispersion had a pH of 10.0, a latex viscosity of 5.1 centistokes at 25° C. and a surface tension of 66.9 dynes/cm. The solid matter contained 3.8% by weight of copolymerized dipotassium-crotylamidosulfonate.

The copolymer dispersions of the invention may be used for coating plastics materials, wood, paper, leather and other materials, as well as for impregnating or finishing paper, felt or fibrous materials.

The following examples serve to illustrate the invention, but they are not intended to limit it thereto, the percentages being by weight:

Example 1

3 grams of dipotassium-methacrylamide-N-sulfonate in 400 ml. of distilled water were placed in a high-pressure autoclave (capacity: 2 liters) made of stainless steel and fitted with stirring means which had been flushed with ethylene. The contents of the autoclave were heated, while stirring, to the reaction temperature of 150° to 160° C. After this temperature had been attained, the autoclave was filled with ethylene until a pressure of 450 atmospheres gauge was established. Against this pressure, a solution of 12 grams dipotassium-methacrylamide-N-sulfonate and 4 grams potassium peroxy disulfate in 300 ml. of distilled water was metered into the reaction space in the course of 70 minutes. The drop in pressure resulting from the progressing polymerization of ethylene was compensated continuously by reintroducing ethylene under pressure.

After the autoclave had been released, a white dispersion having a solid content of 41 percent was obtained. The dispersion had a pH of 11.2, a surface tension at 25° C. of 60.5 dynes/cm. and a latex viscosity of 4.52 centistokes at 25° C. The dispersion dried on a substrate to yield a non-adhesive clear film containing 3.1 percent of copolymerized salt.

When the dispersion was treated with methanol, ethanol or inorganic salt solutions, it was broken. The precipitated ethylene-dipotassium methacrylamide-N-sulfonate copolymer was filtered off with suction, washed repeatedly with water and methanol, and dried. The melting index of the copolymer $i_{15}$, measured at 190° C., was 2.48 grams/10 minutes.

The melting index $i_5$ could not be measured under these conditions. The copolymer had a penetration of $0.5 \times 10^{-1}$ mm. according to DIN (German Industrial Standards) 51579.

From the analysis values K=0.7 percent and S=0.3 percent, there was calculated a content of dipotassium-methacrylamide-N-sulfonate in the insoluble polymer of 2.2 percent.

The filtrates obtained on precipitating and washing were purified and evaporated to dryness. The residue of 13.5 grams corresponded to a proportion of 2.8 percent, calculated on the total solid content, and had a sulfur content of 12.6 percent and a nitrogen content of 4.8 percent.

Example 2

A solution of 1 gram dipotassium-methacrylamide-N-sulfonate in 400 ml. distilled water was placed in a high-pressure autoclave fitted with stirring means (capacity: 2 liters). After the reaction temperature of 140° C. had been attained, a solution of 1 gram dipotassium-methacrylamide-N-sulfonate and 4 grams ammonium peroxy disulfate in 300 ml. water was metered in over a period of 110 minutes against an ethylene pressure of 400 atmospheres gage which was maintained at this height throughout the polymerization by forcing in ethylene under pressure. After the reaction was complete, the autoclave was released and a stable, white dispersion was obtained which had a solid content of 44 percent, a pH value of 9.3, a surface tension at 25° C. of 69 dynes/cm. and a latex viscosity of 7.6 centistokes at 25° C. On drying on a substrate, the dispersion yielded a non-adhesive clear film. The solid contained 0.2 percent of copolymerized dipotassium-methacrylamide-N-sulfonate.

Example 3

10 grams dipotassium-methacrylamide-N-sulfonate in 300 ml. distilled water were placed in an autoclave fitted with stirring means. After heating until the reaction temperature of 140° C. had been attained, ethylene was forced in until a pressure of 600 atmospheres gage was established. A solution of 40 grams dipotassium-methacryl-amide-N-sulfonate and 4 grams potassium peroxy disulfate was metered into the reaction space against this pressure over a period of 55 minutes. The ethylene pressure which decreased as the polymerization proceeded was maintained by reintroducing ethylene under pressure. After the reaction was complete, a stable dispersion was obtained which contained 47 percent of solid material. The surface tension at 25° C. was 46.2 dynes cm., the pH value 10.9, the latex viscosity 15.6 centistokes at 25° C. On drying on a smooth substrate, the dispersion yielded a non-adhesive, slightly turbid film which was substantially resistant to water and the usual organic solvents. The solid contained 7.8 percent of dipotassium-methacryl-amide-N-sulfonate copolymerized with ethylene.

Example 4

50 grams disodium-acrylamide-N-sulfonate in 450 ml. distilled water were placed in a high pressure autoclave fitted with stirring means (capacity: 2 liters). After the contents of the autoclave had been heated to the reaction temperature of 125° to 130° C., ethylene was forced in until a pressure of 300 atmospheres gage was established. Then 7 grams sodium peroxy disulfate in 250 ml. distilled water were metered in over a period of 45 minutes while the drop in the ethylene pressure due to the progressing polymerization was compensated by reintroducing ethylene under pressure. After the reaction was complete, the autoclave was released and a white stable dispersion was obtained which had a solid content of 23 percent. The surface tension was 47.3 dynes/cm. at 25° C., the latex viscosity 2.4 centistokes at 25° C., the pH value 9.9. On drying on a substrate, the dispersion yielded a non-adhesive transparent film. The polymer contained a proportion of 24 percent of copolymerized disodium-acrylamide-N-sulfonate and was insoluble in benzene, methanol, benzine and chloroform in the cold and in the hot.

Example 5

400 ml. distilled water were placed in a high pressure autoclave (capacity: 2 liters) fitted with stirring means and heated to 140° C. After the reaction temperature had been attained, ethylene was forced in until a pressure of 400 atmospheres gage was established. Over a period of 120 minutes, 300 ml. distilled water in which 60 grams dipotassium-methacrylamide-N-sulfonate and 4 grams potassium peroxy disulfate were dissolved were metered into the reaction space against this pressure which was maintained during the reaction by reintroducing ethylene under pressure.

After the release of the autoclave, a white, highly fluid stable dispersion was obtained which had a pH value of 10.6, a surface tension of 58.3 dynes/cm. at 25° C. and a latex viscosity of 8.0 centistokes at 25° C. The solid content amounted to 41.6 percent, in which case the copolymer content of dipotassium-methacrylamide-N-sulfonate amounted to a proportion of 12 percent, calculated on the solid substance. The particle size distribution of the latex particles was very narrow; 95 percent of the particles had a size within the range of from 150 to 270 millimicrons.

Example 6

10 grams dipotassium-methacrylamide-N-sulfonate in 300 ml. distilled water were placed in a high-pressure autoclave fitted with stirring means (capacity: 2 liters). After the solution placed in the autoclave had been heated to the reaction temperature of 140° C., ethylene was forced in until a pressure of 100 atmospheres gage was established. Over a period of 60 minutes, a solution containing another 20 grams dipotassium-methacrylamide-N-sulfonate and 20 grams potassium peroxy disulfate dissolved in 500 ml. distilled water was metered into the reaction space. The drop in the ethylene pressure during the reaction was compensated by reintroducing ethylene under pressure. The pressure existing in the vessel during the reaction was from 80 to 100 atmospheres gage. After the release by means of an ascending tube, a stable dispersion could be isolated which dried on a substrate to yield a clear film and which had a solid content of 17 percent. The content of dipotassium-methacrylamide - N - sulfonate copolymerized with ethylene amounted to 20 percent, calculated on the solid substance.

Example 7

A solution of 10 grams dipotassium-crotylamide-N-sulfonate in 400 ml. distilled water was placed in an autoclave (capacity: 2 liters) fitted with the double-acting magnetically operated agitator. After an internal temperture of 150° C. had been attained, ethylene was forced in until a pressure of 500 atmospheres gage was established. Over a period of 55 minutes, a solution of 20 grams dipotassium-crotylamide-N-sulfonate and 4 grams potassium peroxy disulfate in 300 ml. water was introduced by pumping, while stirring continuously. The consumption of ethylene during the polymerization was compensated by forcing in ethylene under pressure repeatedly. After the release of the autoclave, a white, relatively viscous dispersion was obtained which had a solid content of 26.4 percent. The solid substance contained 12 percent copolymerized dipotassium-crotylamide-N-sulfonate.

Example 8

10 grams dipotassium-methacrylamide-N-sulfonate in 300 ml. water were placed in a high-pressure autoclave (capacity; 2 liters) fitted with stirring means and heated to 150° to 155° C. Then ethylene was forced in until a pressure of 100 atmospheres gage was established. Over a period of 45 minutes, a solution containing 20 grams dipotassium-methacrylamide-N-sulfonate and 10 grams potassium peroxydisulfate was introduced by pumping. The drop in the ethylene pressure due to the progressing reaction was constantly compensated by reintroducing ethylene under pressure.

In this manner there was obtained a slightly turbid, aqueous solution of an ethylene-dipotassium-methacrylamide-N-sulfonate prepolymer, a sample of which was taken off the autoclave. It had a solid content of 9 percent and a surface tension of 35.7 dyness/cm. at 25° C. When the slightly turbid solution was evaporated, a low-polymeric residue was obtained from whose nitrogen value of 2.9 percent there was calculated a proportion of copolymeric dipotassium-methacrylamide-N-sulfonate of 51 percent in the total solid.

After the sample had been taken, the ethylene pressure in the autoclave was increased to 450 to 500 atmospheres gage and a solution of another 10 grams dipotassium-methacrylamide-N-sulfonate and 4 grams potassium peroxy disulfate in 300 ml. water was metered into the reaction space over a period of 45 minutes. The ethylene pressure was maintained at a constant height during the reaction. On releasing the autoclave, a very finely divided, stable dispersion was obtained which dried on a smooth substrate to yield a clear and transparent film, the dispersion having a pH value of 10.4, a surface tension of 47.3 dynes/cm. at 25° C., a latex viscosity of 8.74 centistokes at 25° C. and a solid content of 36.4 percent. The total solid substance contained 7.1 percent of copolymerized dipotassium-methacrylamide-N-sulfonate.

Example 9

A solution of 3 grams dipotassium-methacrylamide-N-sulfonate in 400 ml. distilled water was placed in a high-pressure autoclave (capacity: 2 liters) fitted with stirring means. After the autoclave had been heated to a temperature of 150° to 155° C., ethylene was forced in until a pressure of 450 atmospheres gage was established. Over a period of 55 minutes, 50 grams methyl methacrylate and a solution of 12 grams dipotassium-methacrylamide-N-sulfonate and 4 grams potassium peroxy disulfate in 300 ml. distilled water were introduced by means of two proportioning pumps from two separate reservoirs. The drop in the ethylene pressure due to the progressing polymerization was compensated continuously by forcing in ethylene under pressure. After the autoclave had been released, a stable, finely divided copolymer dispersion was isolated which had a solid content of 29.8 percent. It had a latex viscosity of 10.3 centistokes at 25° C., a pH value of 8.1 and a surface tension of 45.1 dynes/cm. at 25° C. The solid substance of the copolymer dispersion consisted of a proportion of 11.5 percent of methy methacrylate and 3.5 percent of dipotassium-methyacrylamide-N-sulfonate. On drying on a smooth substrate, the dispersion yielded a transparent non-adhesive film.

We claim:

1. A process for the manufacture of aqueous dispersions of copolymers of ethylene with a solid content of 10 to 60% by weight without employing an emulsifier, by copolymerizing ethylene with ethylenically unsaturated compounds at pressures within the range of from 50 to 2500 atmospheres gage, preferably 100 to 1000 atmospheres gage, and at temperatures within the range of from 50° to 250° C., preferably 120° to 180° C., in the presence of 0.1 to 15% by weight (calculated on the solid content of the dispersion) of sodium, potassium, ammoniumperoxidisulfate or hydrogenperoxide which comprises polymerizing ethylene with a di-sodium or di-potassium salt of one or more mono-unsaturated acylamide-N-sulfonic acids corresponding to the formula $$R_1CH=C(R_2)CONH-SO_3H \qquad (I)$$

wherein $R_1$ and $R_2$ each represents a hydrogen atom or an aliphatic, cycloaliphatic or aromatic hydrocarbon radical containing 1 to 10 carbon atoms, in an amount within the range of from 0.1 to 30 percent by weight, calculated on the solid content of the aqueous dispersions.

2. The process as claimed in claim 1, wherein ethylene is polymerized with additional copolymerizable compounds selected from the group consisting of acrylamide, acrylonitrile, alkali metal salts of unsaturated aliphatic and aromatic carboxylic or sulfonic acids containing 1 to 20 carbon atoms, vinyl esters, vinyl halides, open-chain and cyclic N-vinyl amides, styrene, butadiene, and esters of acrylic and methacrylic acid with aliphatic alcohols with 1 to 18 carbon atoms, in an amount of less than 50 percent by weight, calculated on the polymer.

3. The process as claimed in claim 1, wherein the copolymerization is carried out in the presence of the sodium or potassium salt of mono-unsaturated acrylamide- N-sulfonic acids corresponding to Formula I, in which $R_1$ and $R_2$ each represents a hydrogen atom or a hydrocarbon radical containing 1 to 10 carbon atoms.

4. The process as claimed in claim 1, wherein the copolymerization is carried out in the presence of a sodium or potassium salt of mono-unsaturated acrylamide-N-sulfonic acids corresponding to Formula I, in which $R_1$ represents a hydrogen atom or an alkyl radical containing 1 to 10 carbon atoms or phenyl and $R_2$ a hydrogen atom or an alkyl radical containing 1 to 10 carbon atoms.

5. The process as claimed in claim 1, wherein the copolymerization is carried out in the presence of a sodium or potassium salt of methacrylic acid amide-N-sulfonic acid or acrylic acid amide-N-sulfonic acid.

6. The process as claimed in claim 2, wherein as additional copolymerizable compounds there are used esters of acrylic and methacrylic acid with alcohols containing 1 to 18 carbon atoms in an amount within the range of from 15 to 45 percent by weight, calculated on the copolymer.

References Cited

UNITED STATES PATENTS

| | | | |
|---|---|---|---|
| 3,308,081 | 3/1967 | Glabisch | 260—29.6 MQ |
| 3,437,626 | 4/1969 | Glabisch | 260—29.6 TA |

WILLIAM H. SHORT, Primary Examiner

L. M. PHYNES, Assistant Examiner

U.S. Cl. X.R.

20—29.6 MN, 29.6 MQ